United States Patent
Agrawal et al.

(10) Patent No.: US 12,284,046 B2
(45) Date of Patent: Apr. 22, 2025

(54) THROUGHPUT IMPROVEMENT FOR RADIO FRAMES CONTAINING TIME DIVISION DUPLEX (TDD) SPECIAL SLOTS OR TDD/FREQUENCY DIVISION DUPLEX (FDD) RATE-MATCHED SLOTS

(71) Applicant: QUALCOMM Incorporated, San Diego, CA (US)

(72) Inventors: Ashutosh Vinod Agrawal, Bengaluru (IN); Jae Won Yoo, San Diego, CA (US); Manish Jain, San Jose, CA (US); Hari Sankar, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 17/719,261

(22) Filed: Apr. 12, 2022

(65) Prior Publication Data

US 2023/0327825 A1    Oct. 12, 2023

(51) Int. Cl.
| | | |
|---|---|---|
| H04L 1/20 | (2006.01) | |
| H04L 1/00 | (2006.01) | |
| H04L 5/14 | (2006.01) | |
| H04W 72/0446 | (2023.01) | |
| H04W 72/1263 | (2023.01) | |
| H04W 72/563 | (2023.01) | |

(52) U.S. Cl.
CPC ............ *H04L 1/203* (2013.01); *H04L 1/0003* (2013.01); *H04L 1/0067* (2013.01); *H04L 5/14* (2013.01); *H04W 72/0446* (2013.01); *H04W 72/1263* (2013.01); *H04W 72/563* (2023.01)

(58) Field of Classification Search
CPC ..... H04L 1/203; H04L 1/0003; H04L 1/0067; H04L 5/14; H04W 72/563; H04W 72/0446; H04W 72/1263
See application file for complete search history.

(56) References Cited

FOREIGN PATENT DOCUMENTS

| | | |
|---|---|---|
| EP | 3609104 A1 | 2/2020 |
| WO | 2021253154 A1 | 12/2021 |
| WO | WO-2021243481 A1 * | 12/2021 |

OTHER PUBLICATIONS

International Search Report and Written Opinion—PCT/US2023/015134—ISA/EPO—Jun. 13, 2023.

* cited by examiner

*Primary Examiner* — Natasha W Cosme
(74) *Attorney, Agent, or Firm* — Kevin M. Donnelly; Seyfarth Shaw LLP

(57) ABSTRACT

A method for wireless communication by a network node includes transmitting a first group of frames comprising a group of normal slots and one or more first special slots. The method also includes reconfiguring one or more second special slots within a second group of frames scheduled after the first group of frames based on a block error rate (BLER) associated with the group of normal slots failing to satisfy a BLER condition. The method further includes transmitting the second group of frames based on reconfiguring the one or more second special slots within the second group of frames.

30 Claims, 10 Drawing Sheets

THROUGHPUT IMPROVEMENT FOR RADIO FRAMES CONTAINING TIME DIVISION DUPLEX (TDD) SPECIAL SLOTS OR TDD/FREQUENCY DIVISION DUPLEX (FDD) RATE-MATCHED SLOTS

FIELD OF THE DISCLOSURE

The present disclosure relates generally to wireless communications, and more specifically to improving throughput for one or more radio frames containing time division duplex (TDD) special slots or TDD/frequency division duplex (FDD) rate-matched slots.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

In wireless communication systems, a number of data bits associated with a resource element (RE) may be based on a modulation and coding scheme (MCS). A higher MCS may yield a higher spectral efficiency, thus yielding a higher network throughput. The MCS may be based on a radio signal quality and a block error rate (BLER). The BLER may be based on a ratio of a number of transport blocks received in error to a total number of blocks transmitted over a certain number of frames. A network node may adjust an MCS associated with downlink transmissions based on a BLER associated with the downlink transmissions. The MCS may be inversely correlated with the BLER. In some examples, the MCS may be lowered to account for a higher BLER. In some other examples, the MCS may be increased to account for a lower BLER. As discussed, the network throughput may be based on the MCS. Therefore, the network throughput may be inversely correlated with the BLER based on the inverse correlation between the MCS and the BLER.

SUMMARY

In one aspect of the present disclosure, a method for method for wireless communication includes receiving, from a network node, a first group of frames comprising a group of first normal slots and one or more first special slots. The method further includes transmitting, to the network node based on a block error rate (BLER) associated with the group of first normal slots failing to satisfy a BLER condition, a message requesting an adjustment to a schedule or an adjustment to a rank and a modulation and coding scheme (MCS) associated with one or more second special slots within a second group of frames scheduled after the first group of frames. The method still further includes receiving, from the network node, the second group of frames based on transmitting the message.

Another aspect of the present disclosure is directed to an apparatus including means for receiving, from a network node, a first group of frames comprising a group of first normal slots and one or more first special slots. The apparatus further includes means for transmitting, to the network node based on a BLER associated with the group of first normal slots failing to satisfy a BLER condition, a message requesting an adjustment to a schedule or an adjustment to a rank and an MCS associated with one or more second special slots within a second group of frames scheduled after the first group of frames. The apparatus still further includes means for receiving, from the network node, the second group of frames based on transmitting the message.

In another aspect of the present disclosure, a non-transitory computer-readable medium with non-transitory program code recorded thereon is disclosed. The program code is executed by a processor and includes program code to receive, from a network node, a first group of frames comprising a group of first normal slots and one or more first special slots. The program code further includes program code to transmit, to the network node based on a BLER associated with the group of first normal slots failing to satisfy a BLER condition, a message requesting an adjustment to a schedule or an adjustment to a rank and an MCS associated with one or more second special slots within a second group of frames scheduled after the first group of frames. The program code still further includes program code to receive, from the network node, the second group of frames based on transmitting the message.

Another aspect of the present disclosure is directed to an apparatus for wireless communication at a UE. The apparatus includes a processor and a memory coupled with the processor and storing instructions operable, when executed by the processor, to cause the apparatus to receive, from a network node, a first group of frames comprising a group of first normal slots and one or more first special slots. Execution of the instructions further cause the apparatus to transmit, to the network node based on a BLER associated with the group of first normal slots failing to satisfy a BLER condition, a message requesting an adjustment to a schedule or an adjustment to a rank and an MCS associated with one or more second special slots within a second group of frames scheduled after the first group of frames. Execution of the instructions also cause the apparatus to receive, from the network node, the second group of frames based on transmitting the message.

In one aspect of the present disclosure, a method for method for wireless communication includes transmitting a first group of frames comprising a group of first normal slots and one or more first special slots. The method further includes reconfiguring one or more second special slots within a second group of frames scheduled after the first group of frames based on a BLER associated with the number of first normal slots failing to satisfy a BLER condition. The method still further includes transmitting the second group of frames based on reconfiguring the one or more second special slots within the second group of frames.

Another aspect of the present disclosure is directed to an apparatus including means for transmitting a first group of frames comprising a group of first normal slots and one or more first special slots. The apparatus further includes means for reconfiguring one or more second special slots within a second group of frames scheduled after the first group of frames based on a BLER associated with the number of first normal slots failing to satisfy a BLER condition. The apparatus still further includes means for transmitting the second group of frames based on reconfiguring the one or more second special slots within the second group of frames.

In another aspect of the present disclosure, a non-transitory computer-readable medium with non-transitory program code recorded thereon is disclosed. The program code is executed by a processor and includes program code to transmit a first group of frames comprising a group of first normal slots and one or more first special slots. The program code further includes program code to reconfigure one or more second special slots within a second group of frames scheduled after the first group of frames based on a BLER associated with the number of first normal slots failing to satisfy a BLER condition. The program code still further includes program code to transmit the second group of frames based on reconfiguring the one or more second special slots within the second group of frames.

Another aspect of the present disclosure is directed to an apparatus for wireless communication at a network node. The apparatus includes a processor and a memory coupled with the processor and storing instructions operable, when executed by the processor, to cause the apparatus to transmit a first group of frames comprising a group of first normal slots and one or more first special slots. Execution of the instructions further cause the apparatus to reconfigure one or more second special slots within a second group of frames scheduled after the first group of frames based on a BLER associated with the number of first normal slots failing to satisfy a BLER condition. Execution of the instructions also cause the apparatus to transmit the second group of frames based on reconfiguring the one or more second special slots within the second group of frames.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
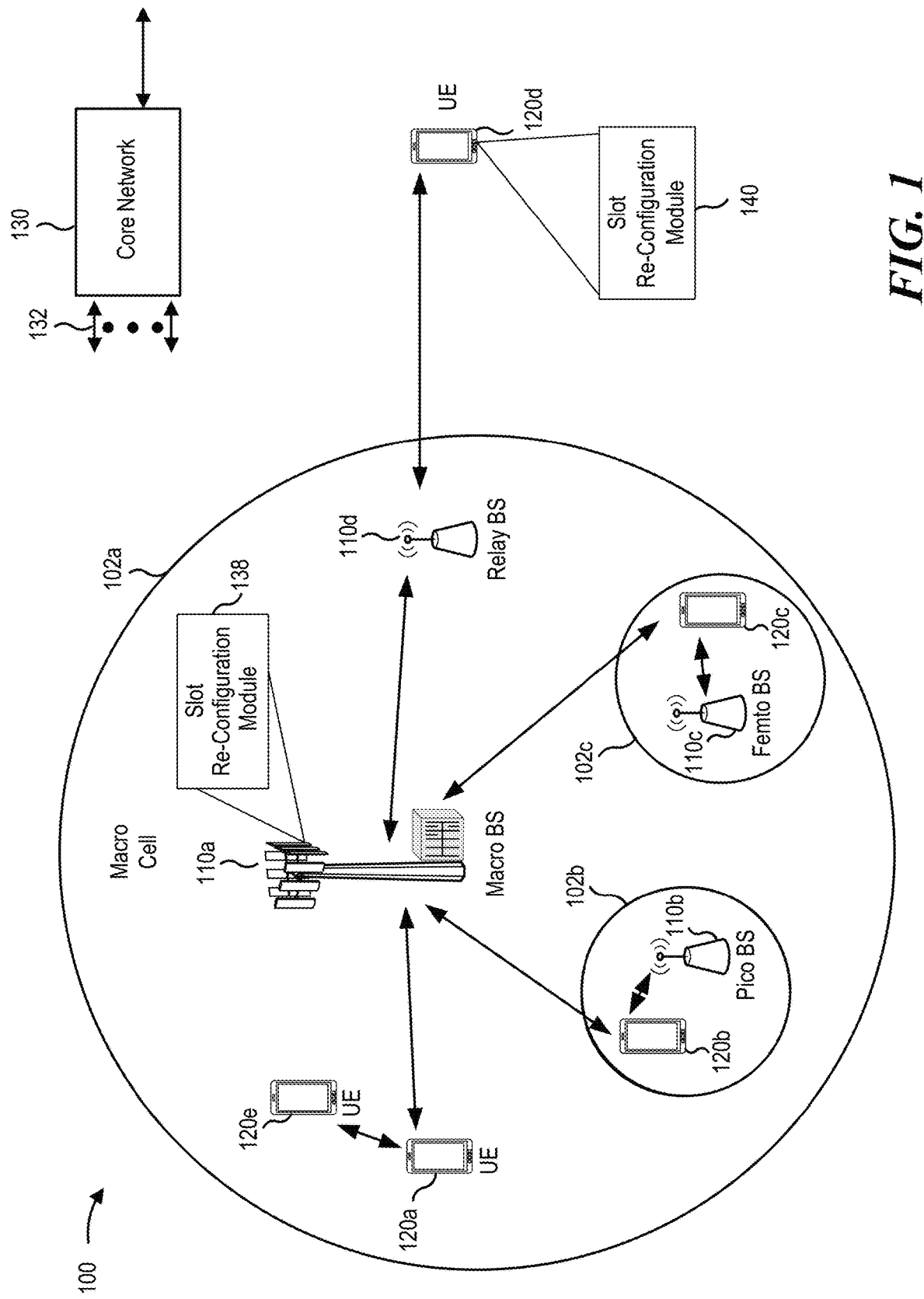
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In wireless communication systems, a number of data bits associated with a resource element (RE) may be based on a modulation and coding scheme (MCS). A higher MCS may yield a higher spectral efficiency, thus yielding a higher network throughput. The MCS may be based on a radio signal quality and a block error rate (BLER). The BLER may be based on a ratio of a number of transport blocks received in error to a total number of blocks transmitted over a certain number of frames. A network node may adjust an MCS for downlink transmissions based on a BLER associated with the downlink transmissions. The MCS may be inversely correlated with the BLER. In some examples, the MCS may be lowered to account for a higher BLER. In some other examples, the MCS may be increased to account for a lower BLER.

In some examples, a user equipment (UE) cannot support uniform spectral efficiency across all slots for a given signal-to-noise ratio (SNR) and channel condition. In some such examples, because the spectral efficiency is not uniform, different slots in a radio frame may be associated with different respective transmission (TX) block error rates (BLERs). In such examples, an MCS associated with a highest TX BLER (also referred to generally herein as a "BLER") among the different TX BLERs may be used as the MCS for each slot in the radio frame. Therefore, normal slot throughput, as well as overall network throughput, may be limited to a network throughput that is achievable with the MCS for the highest TX BLER, such as an MCS associated with special slots. A special slot is an example of a slot that has a spectral efficiency that is different than a spectral efficiency of a normal slot. In some examples, a special slot may be a time division duplex (TDD) slot associated with a number of downlink symbols that is less than a number of downlink symbols associated with the normal slot. In some other examples, a special slot may be a TDD/frequency division duplex (FDD) rate-matched slot associated with a number of resource elements (REs) that is less than a number of REs associated with the normal slot. In such examples, the TDD/FDD rate-matched slot may be multiplexed with another signal, thereby reducing the number of REs allocated to the TDD/FDD rate-matched slot. In other examples, a special slot may be dynamically configured as an uplink slot or a downlink slot. It may be desirable to improve network throughput for scenarios where a radio frame includes one or more special slots.

Aspects of the present disclosure generally relate to wireless communication, and specifically to techniques and apparatuses for improving network throughput by reconfiguring special slots in a group of radio frames. In some examples, a network node sends downlink transmissions via one or more slots within a first group of frames. Based on the downlink transmissions, the network node may determine whether a normal slot BLER associated with the one or more normal slots satisfies a BLER condition. The BLER condition may be satisfied based on the normal slot BLER being greater than a difference between a target BLER and a margin BLER value. Failure to satisfy the BLER condition may indicate that the normal slots within the first group of frames support a spectral efficiency that is different than a spectral efficiency supported by special slots within the first group of frames. In some examples, overall network throughput may be limited when two groups of slots support different spectral efficiencies. In some aspects, the network node may re-configure one or more special slots within a second group of frames based on the normal slot BLER failing to satisfy the BLER condition. In some examples, the one or more special slots may be re-configured by assigning the one or more special slots to a first link adaptation loop that is different than a second link adaptation loop assigned to each normal slot within the second group of frames. In some other examples, the network node may re-configure the one or more special slots by canceling transmissions scheduled on the one or more special slots. In some other examples, the network node may re-configure the one or more special slots by adjusting a rank and MCS associated with the one or more special slots. The network node may transmit downlink information via the second group of frames after reconfiguring the one or more special slots within the second group of frames.

Particular aspects of the subject matter described in this disclosure may be implemented to realize one or more of the following potential advantages. In some examples, the described techniques may improve normal slot throughput that would otherwise be limited based on normal slots within one or more radio frames supporting a spectral efficiency that is different than a spectral efficiency supported by special slots in the one or more radio frames. In such examples, the described techniques specify a process for reconfiguring the special slots to remove the limit on the normal slot throughput. In some examples, reconfiguring the special slots to use a different link adaptation loop improves throughput on the normal slots because a link adaptation loop associated with the normal slots is no longer bound by the spectral efficiency of the special slots. In some other examples, canceling transmissions scheduled on the special slots may improve normal slot throughput because the normal slot throughput may no longer be limited to a throughput that is achievable based on an MCS associated with the special slots. In still other examples, adjusting a rank and MCS associated with the special slots may improve throughput on the special slots, which may also improve throughput on the normal slots.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a slot reconfiguration module 140. For brevity, only one UE 120d is shown as including the slot reconfiguration module 140. The slot reconfiguration module 140 is configured to perform operations, including operations of the process 800 described below with reference to FIG. 8.

The core network 130 or the base stations 110 may include a slot reconfiguration module 138. The slot reconfiguration module 138 is configured to perform operations, including operations of the process 1000 described below with reference to FIG. 10.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

Figure 2:
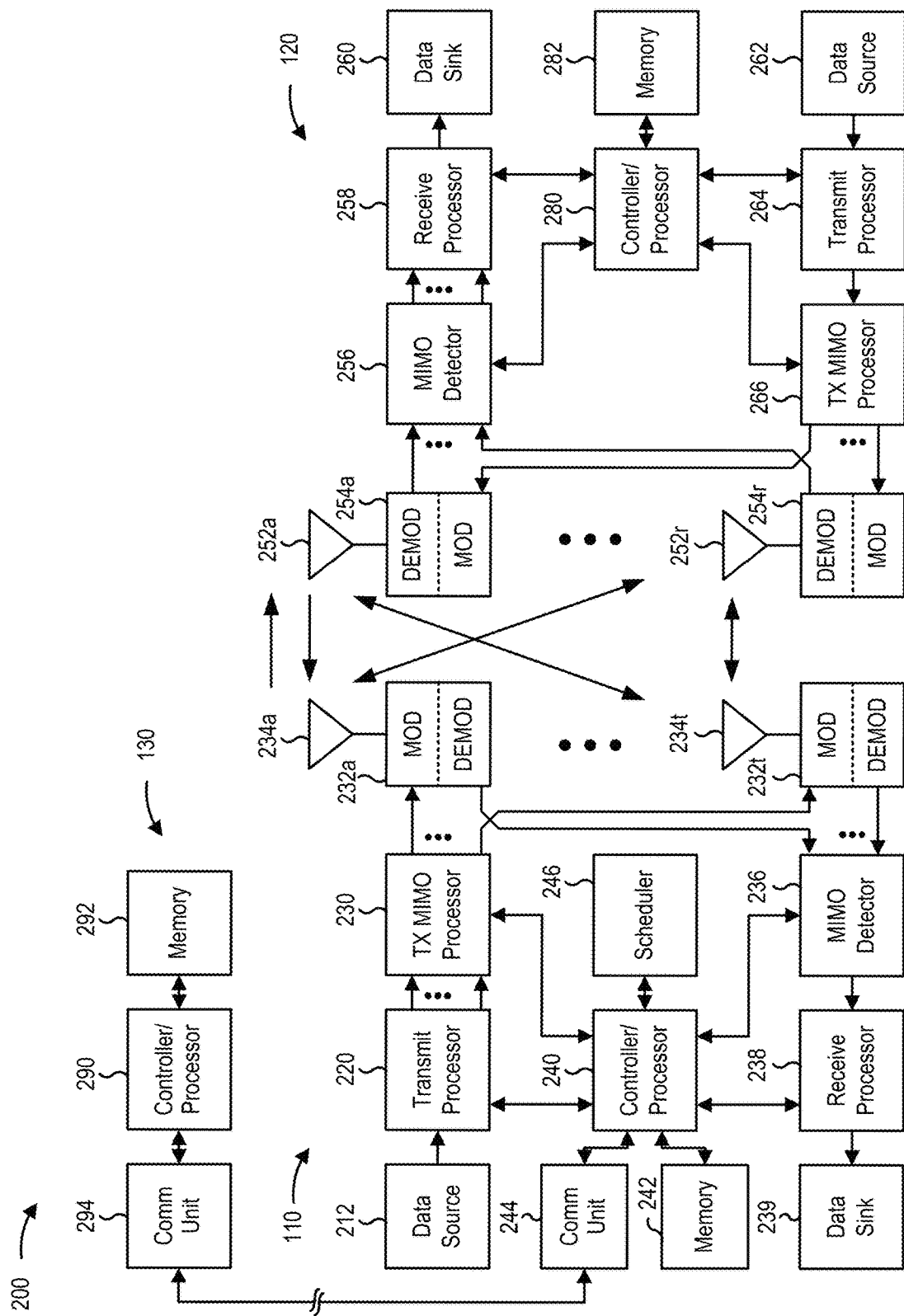
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with reconfiguring one or more special slots, as described in more detail elsewhere. For example, the controller/processor 240 of the base station 110, the controller/processor 280 of the UE 120, and/or any other component(s) of FIG. 2 may perform or direct operations of, for example, the processes of FIGS. 8 and 10 and/or other processes as described. Memories 242 and 282 may store data and program codes for the base station 110 and UE 120, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
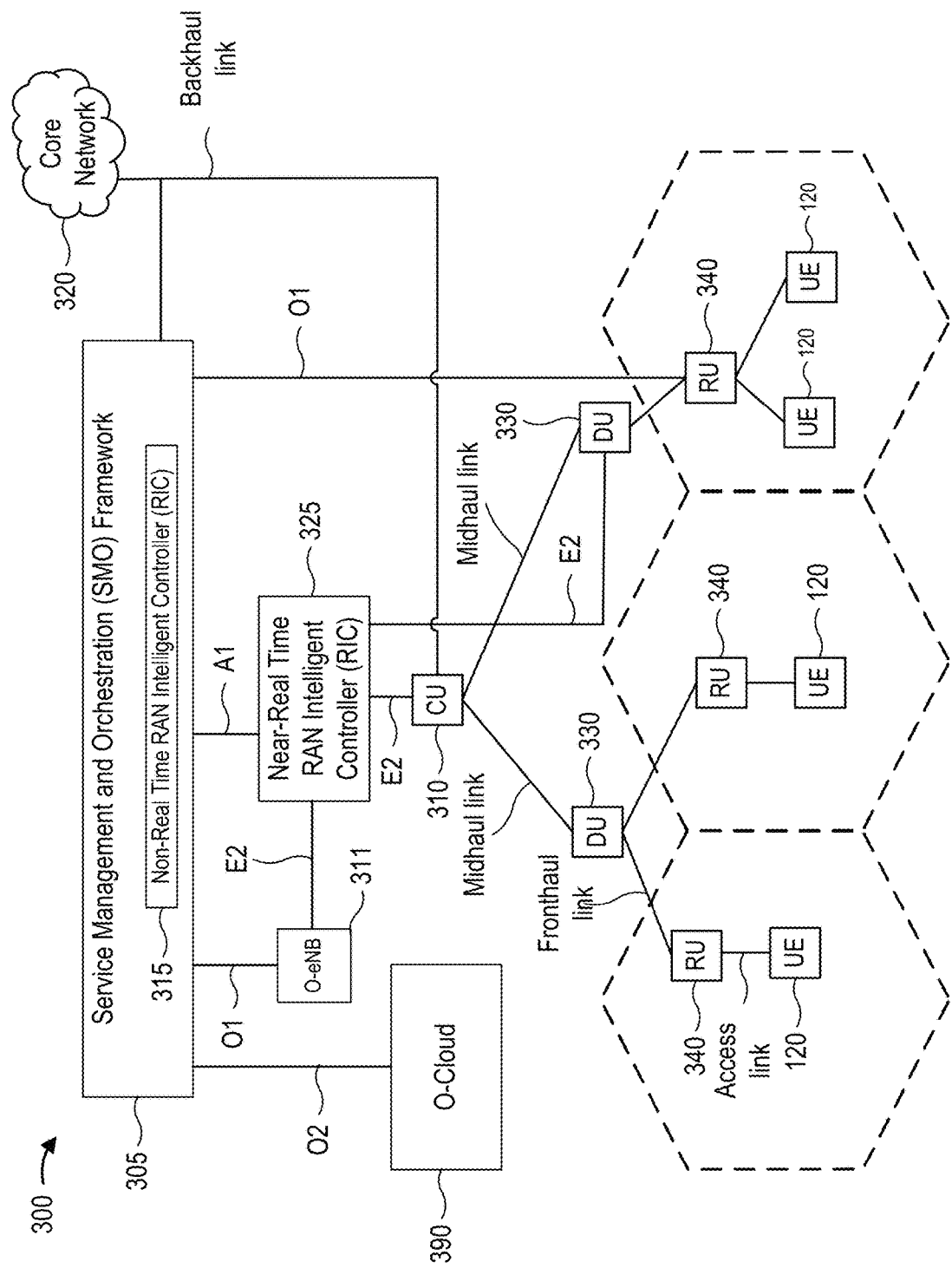
FIG. 3 is a diagram illustrating an example disaggregated base station architecture.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) X11, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the Non-RT RIC 315 or the near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
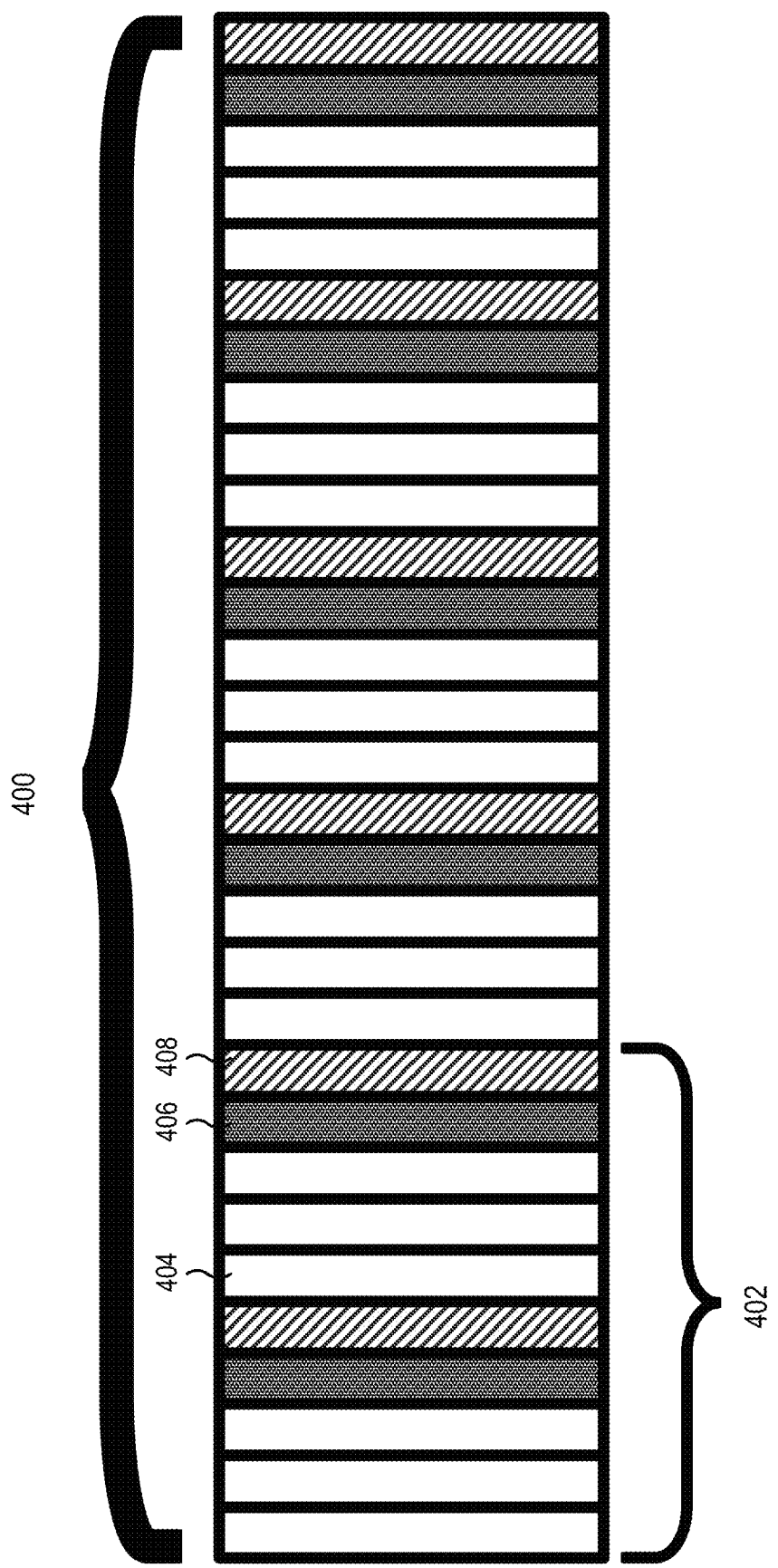
FIG. 4 is a block diagram illustrating an example of a group of radio slots, in accordance with various aspects of the present disclosure.

In wireless communication systems, a radio frame may include multiple slots. An example of a radio frame with multiple slots is shown in FIG. 4, which illustrates an example of a group of radio slots 400, in accordance with various aspects of the present disclosure. In the example of FIG. 4, the group of radio frames 400 may include multiple radio frames 402. Each radio frame 402 may include ten or more slots. Each slot may be a normal downlink slot 404, a special slot 406, or a normal uplink slot 408. For ease of explanation, only one normal downlink slot 404, one special slot 406, and one normal uplink slot 408 are labeled in the example of FIG. 4. In some examples, the link direction of a slot may be static. A normal slot is an example of a slot configured with a static link direction. In such examples, each normal slot may be associated with a link direction, such as downlink (D) or uplink (U). Thus, as shown in FIG. 4, some slots are normal downlink slots 404 and some other slots are normal uplink slots 408. In other examples, a link direction of a slot may be dynamic, such that the link direction may change between uplink and downlink. The special slot 406 (S) is an example of a slot with a dynamic link direction. Additionally, in some examples, one or more slots of a radio frame 402 may be rate-matched based on a different signal multiplexed with a downlink transport block (TB) received from a base station. In such examples, a slot may be rate-matched based on a reference signal or a synchronization signal. Rate matching generally refers to matching a number of bits in a TB to a number of bits that can be transmitted in a given resource allocation.

In wireless communication systems, a number of data bits associated with a resource element (RE) may be based on a modulation and coding scheme (MCS). A higher MCS may yield a higher spectral efficiency, thus yielding a higher network throughput. Thus, network throughput may be limited by an MCS supported by one or more slots in a radio frame. The MCS may be based on a radio signal quality and a block error rate (BLER). The BLER may be based on a ratio of a number of transport blocks received in error to a total number of blocks transmitted over a certain number of frames. A network node may adjust an MCS for the downlink transmissions based on a BLER associated with the downlink transmissions. The MCS may be inversely correlated with the BLER. In some examples, the MCS may be lowered to account for a higher BLER. In some other examples, the MCS may be increased to account for a lower BLER.

In some examples, a UE cannot support uniform spectral efficiency across all slots for a given signal-to-noise ratio (SNR) and channel condition. In some such examples, because the spectral efficiency is not uniform, different slots in a radio frame may be associated with different respective transmission (TX) block error rates (BLERs). As such, the slots in the radio frame may not support a uniform MCS. In such examples, an overall MCS may be determined based on a TX BLER associated with the one or more slots with a lowest spectral efficiency. Specifically, in such examples, an MCS associated with a highest TX BLER among the different TX BLERs may be used as the overall MCS for each slot in the radio frame. Therefore, overall network throughput may be limited to a network throughput that is achievable based on the MCS associated with the highest TX BLER.

In some examples, the UE may fail to support uniform spectral efficiency when a special slot has equal to or less than seven symbols allocated for physical downlink shared channel (PDSCH) scheduling due to a presence of one demodulation reference signal (DMRS) symbol. In such examples, an outer loop link adaptation (OLLA) target BLER for a network node may be 10% and the special slot may constitute 25% of the downlink slots in a time division duplex (TDD) grant pattern (for example, a DDDSU grant pattern). The BLER associated with the special slot may be 40% when a special slot retransmission occurs on a normal slot. In some such examples, an MCS that may be supported by the special slot may be less than an MCS that may be supported by the normal slots. The difference between the respective MCSs supported by special slots and normal slots may increase based on an increase in one or both of a Doppler effect or an SNR. In such examples, an overall network throughput may be limited because the MCS supported by the special slot may be less than the MCS supported by the normal slots.

In some other examples, the UE may fail to support uniform spectral efficiency when a downlink channel, such as a PDSCH, is rate-matched on one or more slots. The one or more slots may be rate-matched based on a reference signal, such as a phase tracking-reference signal (PT-RS), a non-zero power (NZP) or zero power (ZP) channel state information-reference signal (CSI-RS), or a synchronization signal block (SSB). Alternatively, higher layer configurations, such as "rateMatchPatternToAddModList" or "lte-CRS-ToMatchAround" may cause a downlink channel to be rate-matched around multiple resource blocks or resource elements in one or more slots. In such examples, an effective code rate associated with the one or more rate-matched slots may be greater than an effective code rate associated with the one or more non-rate-matched slots, resulting in the rate-matched slots supporting a lower MCS in comparison to the non-rate-matched slots.

As discussed, various aspects of the present disclosure are directed to improving network throughput when slots in a radio frame cannot support a uniform spectral efficiency. For ease of explanation, various examples use a special slot as an example of a type of slot that may be re-configured. Still, aspects of the present disclosure are not limited to reconfiguring special slots. As discussed, other types of slots, such as rate-matched slots, may be re-configured. Rate-matched slots may be TDD slots or frequency division duplex (FDD) slots. In the examples discussed below, the term "special slot" may be used to refer to a slot that may be dynamically configured as an uplink slot or a downlink slot, as well as another type of slot, such as a rate-matched slot.

Figure 5:
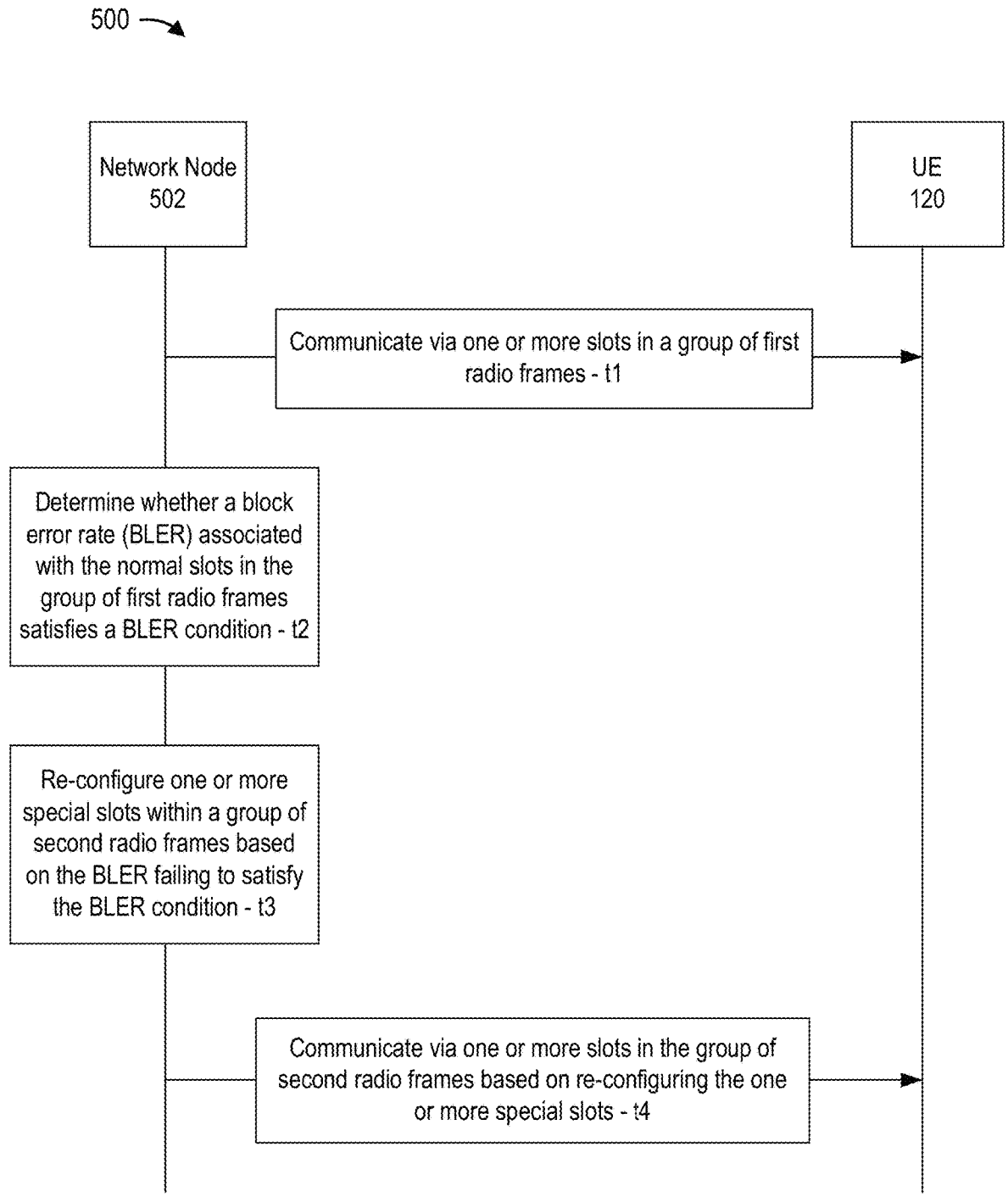
FIG. 5 is a timing diagram illustrating an example of initiating a procedure for improving network throughput, in accordance with various aspects of the present disclosure.

In some examples, a network node may initiate one or more procedures for improving network throughput based on determining a BLER condition is satisfied. FIG. 5 is a timing diagram illustrating an example 500 of initiating a procedure for improving network throughput, in accordance with various aspects of the present disclosure. In the example 500 of FIG. 5, a network node 502 may be an example of a base station 110, a CU 310, a DU 330, or an RU 340, as described with reference to FIGS. 1 and 3, respectively.

As shown in FIG. 5, at time t1, the network node 502 may communicate with a UE 120 via one or more slots in a first group of frames. The one or more slots may include one or more downlink slots, uplink slots, and special slots. During the communications performed at time t1, the network node may determine an overall TX BLER for normal slots $BLER_{NS}$ (for example, first TX BLER) in the first group of frames and an overall TX BLER for special slots $BLER_{SS}$ in the first group of frames. The overall TX BLER may be an average BLER over a period of time. The first group of frames may include one or more radio frames.

At time t2, based on the communications performed at time t1, the network node 502 may determine whether a BLER associated with the normal slots in the first group of frames satisfies a BLER condition. In some examples, the BLER condition may be satisfied when an overall TX BLER ($BLER_{NS}$) associated with all normal slots in the one or more first radio frames is greater than a difference between a target OLLA BLER and a BLER margin ($mairgn_{bler}$). In some examples, the target OLLA BLER may be 10%. As shown in FIG. 5, at time t3, the network node 502 re-configures one or more special slots (for example, each special slot) within a second group of frames based on the BLER failing to satisfy the BLER condition (for example, $BLER_{NS}$<target OLLA BLER-$mairgn_{bler}$). In some examples, the special slots may be re-configured by adjusting a respective scheduling of each special slot, adjusting a respective MCS and a respective rank of each special slot, or assigning each special slot to a link adaptation loop that is different than a link adaption loop assigned to the normal slots in the second group of frames. As shown in FIG. 5, at time t4, the network node 502 communicates with the UE 120 on the second group of frames based on reconfiguring the one or more special slots in the second group of frames.

As discussed in the example 500 of FIG. 5, the network node 502 may re-configure each special slot in a group of radio frames based on the normal slots in a group of previous radio frames failing to satisfy a BLER condition. In some examples, the special slots, such as the special slots 406 described with reference to FIG. 4, may be re-configured by assigning each special slot to a link adaptation loop that is different than a link adaptation loop used by the normal slots in the group of radio frames. The normal slots may be the normal downlink slots 404 described with reference to FIG. 4, and the group of radio frames may be the group of radio frames 400 described with reference to FIG. 4. In such examples, all slots in a radio frame may maintain a target BLER based on assigning a first link adaptation loop (for example, outer loop) to the special slots and a second link adaptation loop to the normal slots. Specifically, in some examples, by using different link adaption loops for the special slots and normal slots, the special slots may maintain a lower MCS grant and the normal slots may maintain a higher MCS grant. In some examples, the normal slots and the special slots may use a same link adaptation loop prior to the special slots being re-configured.

In addition to using a separate link adaptation loop for the special slots, the network node may also use a different rank on the special slots. The rank may be different than a rank reported by a UE. In some examples, using a different rank on special slots may improve spectral efficiency when the UE has a special receiver for the special slots. The precoding matrix indicator (PMI) for the different rank may be obtained from a sounding reference signal (SRS) SRS configured for antenna switching.

Figure 6:
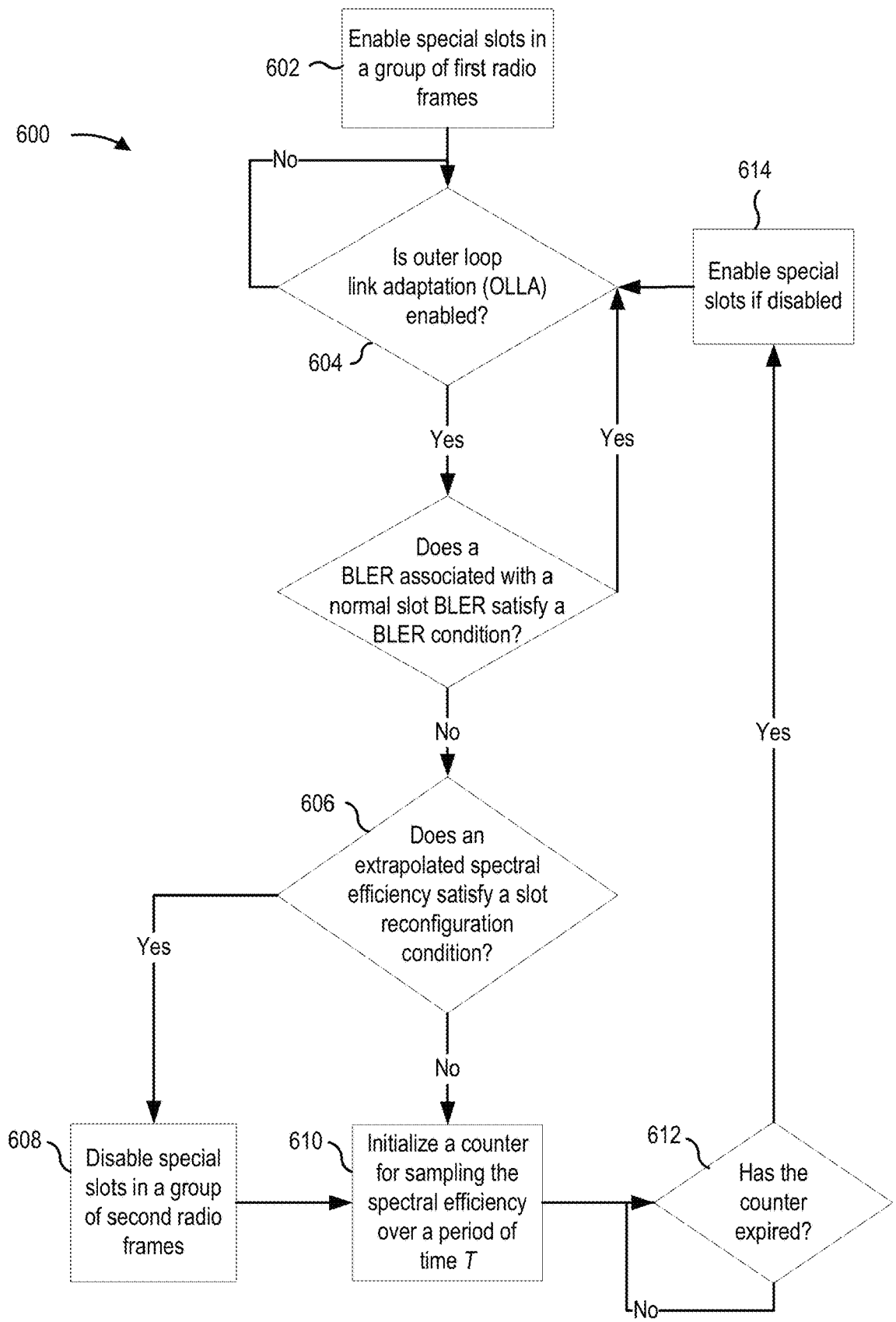
FIG. 6 is a flow diagram illustrating an example of a process for adjusting special slot scheduling, in accordance with various aspects of the present disclosure

As discussed, in some examples, the network node 502 may re-configure each special slot in a group of radio frames by adjusting (for example, disabling) a respective schedule of each special slot. In such examples, a respective transmission scheduled on each special slot may be cancelled for a group of radio frames. FIG. 6 is a flow diagram illustrating an example of a process 600 for adjusting special slot scheduling based on one or more normal slots in a radio frame failing to satisfy a BLER condition, in accordance with various aspects of the present disclosure. The process 600 may be performed by a network node 502.

As shown in FIG. 6, at block 602, the process 600 may begin with special slots being scheduled for a first group of frames. In such examples, the network node may communicate with another device, such as a UE, via the first group of frames. In some such examples, the network node may determine an overall TX BLER for normal slots $BLER_{NS}$ (for example, first TX BLER) in one or more radio frames of the first group of frames and an overall TX BLER for special slots $BLER_{SS}$ in one or more radio frames of the first group of frames. The network node may also determine an occupancy rate (for example, slot rate (SR)) for the special slots ($SR_{SS}$) and an occupancy rate ($SR_{NS}$) for the normal slots in the one or more radio frames (for example, $SR_{SS}+SR_{NS}=1$).

At block 604, the process 600 determines if OLLA is enabled at the network node. If OLLA is not enabled, the process 600 continues to check the OLLA status at block 604. Alternatively, if OLLA is enabled, the process proceeds to block 616. At block 616, the process determines if a BLER associated with the normal slot $BLER_{NS}$ in the first group of frames fails to satisfy the BLER condition. In some such examples, the BLER may fail to satisfy the BLER condition based on the BLER being less than a difference between a target BLER, such as a target OLLA BLER, and a margin (for example, $BLER_{NS}$<Target OLLA BLER–$margin_{bler}$). The margin may be used to accommodate inaccuracies in the target BLER convergence. In some examples, the target BLER is 10% and the margin may be 20% of the target BLER.

The process 600 may proceed to block 606 if the BLER associated with the normal slot $BLER_{NS}$ fails to satisfy the BLER condition. Alternatively, the process 600 may return to block 604 for a subsequent first group of frames. At block 606, the process 600 determines if an extrapolated spectral efficiency satisfies a special slot reconfiguration condition. The extrapolated spectral efficiency may be a spectral efficiency for a group of radio frames, in which special slots are not scheduled in the group of radio frames. In some examples, based on OLLA being enabled, over a time period T, such as the one or more radio frames, the network node may estimate a spectral efficiency ($SE_{NS}$) obtained over the normal slots:

$$SE_{NS}=SR_{NS}*(1-BLER_{NS})*SPEFF_{MCS}. \quad (1)$$

In Equation 1, $BLER_{NS}$ represents the Tx BLER on the normal slots, $SPEFF_{MCS}$ represents a spectral efficiency per resource element for a mean MCS scheduled over the time period T. Additionally, the network node may estimate the spectral efficiency obtained over the special slots:

$$SE_{SS}=SR_{SS}*R_{symb}*(1-BLER_{SS})*SPEFF_{MCS'}. \quad (2)$$

In Equation 2, $R_{symb}$ represents a ratio of a number of PDSCH REs available in the special slots and a number of PDSCH REs available in the normal slots. The number of available PDSCH REs includes resource elements that may be rate-matched or symbols used as a guard duration or symbols used for uplink transmissions on special slots. Additionally, $SPEFF_{MCS'}$ represents a spectral efficiency for the MCS scheduled on the special slots. A total obtained spectral efficiency $SE_T$ may be a sum of the normal slot spectral efficiency $SE_{NS}$ and the special slots spectral efficiency $SE_{SS}$ (for example, $SE_T=SE_{NS}+SE_{SS}$). The extrapolated spectral efficiency $SE_{EP}$ is given by:

$$SE_{EP}=SR_{NS}*(1-0.1)*SPEFF_{MCS\_EP}. \quad (3)$$

In Equation 3, $SPEFF_{MCS\_EP}$ represents the spectral efficiency for the MCS obtainable on the normal slots at a target BLER, such as 10% BLER, using a reported mean CQI and a CQI to MCS mapping. The spectral efficiency corresponding to the MCS may be $SPEFF_{MCS\_EP}$.

In some examples, at block 606, the extrapolated spectral efficiency satisfies the special slot reconfiguration condition if the extrapolated spectral efficiency is greater than a sum of a total spectral efficiency $SE_T$ and a margin spectral efficiency margin_speff (for example, $SE_{EP}>SE_T+$margin_speff). A value of the margin spectral efficiency may be in bits per second per Hertz. Additionally, the margin spectral efficiency may be cumulative across all layers for a rank that is scheduled. In the example of FIG. 6, at block 608, the network node may disable scheduling of special slots in a second group of frames based on the extrapolated spectral efficiency satisfying the special slot reconfiguration condition. Transmissions scheduled on the special slots may be cancelled as a result of disabling the special slot scheduling. Although not shown in the example of FIG. 6, in some other examples, rather than disabling the scheduling of the special slots for the second group of frames, at block 608, the process 600 may adapt an MCS and rank for special slots for the second group of frames.

Additionally, in the example of FIG. 6, if the special slot scheduling is disabled, the network node may periodically enable the special slot scheduling to re-evaluate the BLER condition and normal slot BLER in the presence of special slot scheduling. Thus, in some examples, at block 610, the process 600 initializes a counter for sampling the spectral efficiency over the period of time T. At block 612, the process 600 determines whether the counter has expired. Upon expiration of the counter, the process 600 proceeds to block 614 to enable special slot scheduling for a subsequent group of radio frames (for example, a group of third radio frames) if the special slot scheduling was cancelled for a current group of radio frames. In some examples, if the extrapolated spectral efficiency does not satisfy the special slot reconfiguration condition at block 606, the process 600 proceeds to block 610.

In some examples, to counter an effect of errors in CQI reporting used to extrapolate a spectral efficiency for normal slots $SE_{EP}$, the network node may monitor an error between a reported CQI based MCS and a final MCS converged to using a link adaptation loop (for example, outer loop) when special slots scheduling has been disabled. The error in spectral efficiency may be used in an iteration when special slots are enabled to re-evaluate the normal slot BLER. In such examples, the extrapolated spectral efficiency may be updated as:

$$SE_{EP}=SR_{NS}*(1-0.1)*SPEFF_{MCS\_EP}+\Delta speff. \quad (4)$$

In Equation 4, $\Delta speff$ may represent a difference between the MCS and the CQI mapped MCS. The MCS may be an MCS with special slots disabled and OLLA enabled. In some examples, the period of time T may be equal to a time for OLLA to converge to the target BLER.

As discussed above, in some examples, a network node may re-configure each special slot in a group of radio frames by adjusting a respective rank and MCS of each special slot in a group of radio frames. In some implementations, the rank and MCS may be adjusted for a period when a schedule for the special slots is enabled. In such examples, the rank and MCS of each special slot in the group of radio frames may be adjusted to be less than a rank and an MCS of the normal slots in the group of radio frames. The rank of each special slot $RANK_{SS}$ may be the difference between the rank of the normal slots $RANK_{NS}$ and a rank offset $RANK_{off}$ (for example, $RANK_{SS}=RANK_{NS}-RANK_{off}$). Additionally, the MCS of each special slot $MCS_{SS}$ may be the difference between the rank of the normal slots $MCS_{NS}$ and a rank offset $MCS_{off}$ (for example, $MCS_{SS}=MCS_{NS}-MCS_{off}$). The rank and MCS of the special slots may be adjusted when evaluating the total spectral efficiency, such as the evaluation of the total spectral efficiency and the extrapolated spectral efficiency as described in block 606 of FIG. 6. In some examples, the rank and MCS of the special slots may be adaptively reduced to reach a point where the extrapolated spectral efficiency is less than or equal to a sum of the total spectral efficiency and a margin spectral efficiency (for example, $SE_{EP}<=SE_T+margin\_speff$). In such examples, the scheduling of the special slots may be permanently enabled when the extrapolated spectral efficiency is less than or equal to the sum of the total spectral efficiency and the margin spectral efficiency.

Aspects of the present disclosure are not limited to the network node initiating the special slot reconfiguration. In some implementations, a UE may request the network node to re-configure the special slots. In such implementations, the UE may indicate support for enabling and disabling special slot scheduling as well as indicating support for a separate rank and MCS for the special slots. The support may be indicated via signaling, such as RRC signaling. In some examples, the UE may request the network node to disable the special slot scheduling for a group of radio frames. In some other examples, the UE may request the network node to adjust the rank and MCS of the special slots for a group of radio frames. In some implementations, the UE may signal one or more bits to the network node, where the bits indicate a request to enable or disable the special slot scheduling or to adjust the MCS and rank for the special slots. In some examples, when adjusting the MCS and rank for the special slots, the network node may use an MCS and rank set for the special slots that is different than an MCS and rank set of the normal slots. The UE may indicate a number of slots in a radio frame with a set of bits. Each set of bits may be associated with a respective slot in the radio frame, such that each slot in the radio frame is associated with a different set of bits.

Figure 7:
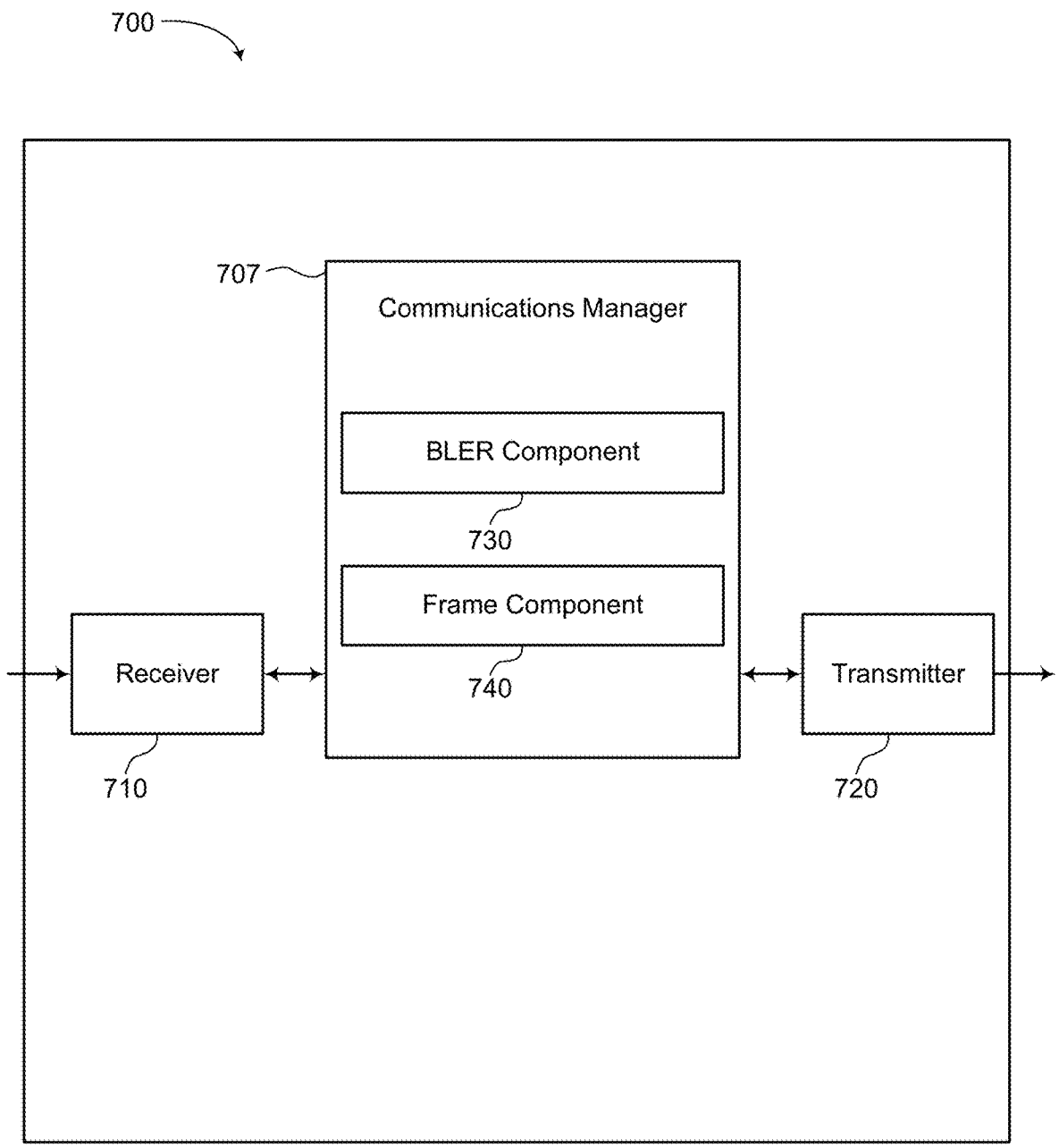
FIG. 7 is a block diagram illustrating an example wireless communication device that supports reconfiguring special slots, in accordance with some aspects of the present disclosure.

FIG. 7 is a block diagram illustrating an example wireless communication device that supports multiple PRACH transmissions, in accordance with some aspects of the present disclosure. The device 700 may be an example of aspects of a UE 120 described with reference to FIGS. 1, 2, 3, and 5. The wireless communications device 700 may include a receiver 710, a communications manager 707, a transmitter 720, a BLER component 730, and a frame component 740, which may be in communication with one another (for example, via one or more buses). In some examples, the wireless communications device 700 is configured to perform operations, including operations of the process 800 described below with reference to FIG. 8.

In some examples, the wireless communications device 700 can include a chip, chipset, package, or device that includes at least one processor and at least one modem (for example, a 5G modem or other cellular modem). In some examples, the communications manager 707, or its sub-components, may be separate and distinct components. In some examples, at least some components of the communications manager 707 are implemented at least in part as software stored in a memory. For example, portions of one or more of the components of the communications manager 707 can be implemented as non-transitory code executable by the processor to perform the functions or operations of the respective component.

The receiver 710 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communications devices via various channels including control channels (for example, a physical downlink control channel (PDCCH), physical uplink control channel (PUCCH), or physical sidelink control channel PSCCH) and data channels (for example, a physical downlink shared channel (PDSCH), physical sidelink shared channel (PSSCH), a physical uplink shared channel (PUSCH)). The other wireless communications devices may include, but are not limited to, a base station 110 described with reference to FIGS. 1 and 2, a DU 330 described with reference to FIG. 3, a CU 310 described with reference to FIG. 3, or a network node 502 described with reference to FIG. 5.

The received information may be passed on to other components of the device 700. The receiver 710 may be an example of aspects of the receive processor 356 described with reference to FIG. 3. The receiver 710 may include a set of radio frequency (RF) chains that are coupled with or otherwise utilize a set of antennas (for example, the set of antennas may be an example of aspects of the antennas 252 described with reference to FIG. 2).

The transmitter 720 may transmit signals generated by the communications manager 707 or other components of the wireless communications device 700. In some examples, the transmitter 720 may be collocated with the receiver 710 in a transceiver. The transmitter 720 may be an example of aspects of the transmit processor 368 described with reference to FIG. 3. The transmitter 720 may be coupled with or otherwise utilize a set of antennas (for example, the set of antennas may be an example of aspects of the antennas 352 described with reference to FIG. 3), which may be antenna elements shared with the receiver 710. In some examples, the transmitter 720 is configured to transmit control information in a PUCCH, PSCCH, or PDCCH and data in a physical uplink shared channel (PUSCH), PSSCH, or PDSCH.

The communications manager 707 may be an example of aspects of the controller/processor 359 described with reference to FIG. 3. The communications manager 707 may include the BLER component 730 and the frame component 740. In some examples, working in conjunction with the receiver 710, the frame component 740 receives, from a network node, a first group of frames comprising a group of first normal slots and one or more first special slots. Furthermore, working in conjunction with one or both of the transmitter 720 or the frame component 740, the BLER component 730 transmits, to the network node based on a BLER associated with the group of first normal slots failing to satisfy a BLER condition, a message requesting an adjustment to a schedule or an adjustment to a rank and a MCS associated with one or more second special slots within a second group of frames scheduled after the first group of frames. Working in conjunction with the receiver 710, the frame component 740 receives, from the network node, the second group of frames based on transmitting the message.

Figure 8:
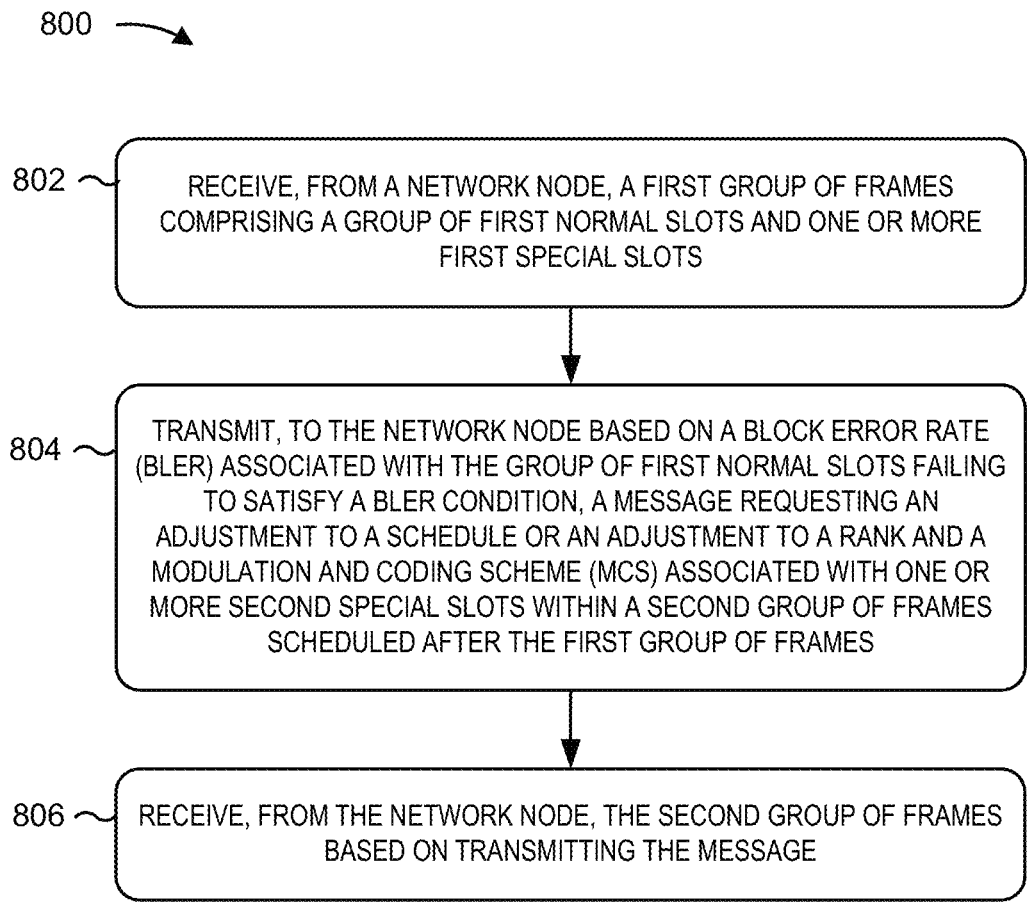
FIG. 8 is a flow diagram illustrating an example of a process performed by a UE, in accordance with some aspects of the present disclosure.

FIG. 8 is a flow diagram illustrating an example process 800 performed by a UE, in accordance with some aspects of the present disclosure. The UE may be an example of a UE 120 described with reference to FIGS. 1, 2, 3, and 5. The example process 800 is an example of reconfiguring special slots. As shown in FIG. 8, the process 800 begins at block 802 by receiving, from a network node, a first group of frames comprising a group of first normal slots and one or more first special slots. At block 804, the process transmits, to the network node based on a BLER associated with the group of first normal slots failing to satisfy a BLER condition, a message requesting an adjustment to a schedule or an adjustment to a rank and a MCS associated with one or more second special slots within a second group of frames scheduled after the first group of frames. The second group of frames include a group of second normal slots and the one or more second special slots. At block 806, the process receives, from the network node, the second group of frames based on transmitting the message.

Figure 9:
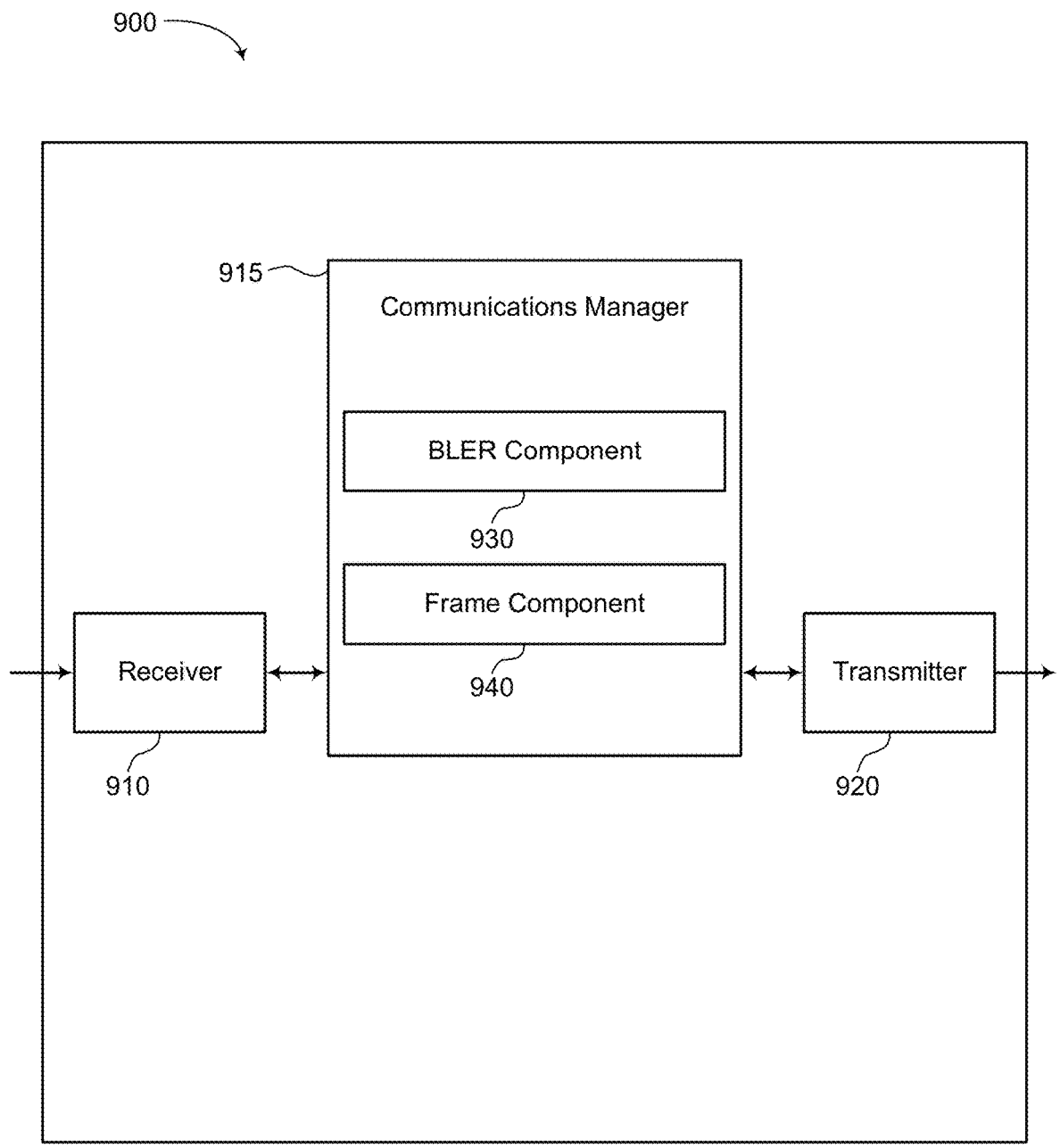
FIG. 9 is a block diagram illustrating an example wireless communication device that supports reconfiguring special slots, in accordance with some aspects of the present disclosure.

FIG. 9 is a block diagram illustrating an example wireless communication device 900 that supports receiving multiple PRACH transmissions from a single UE, in accordance with aspects of the present disclosure. The wireless communication device 900 may be an example of a base station 110 described with reference to FIGS. 1 and 2, a DU 330 described with reference to FIG. 3, a CU 310 described with reference to FIG. 3, or a network node 502 described with reference to FIG. 5. The wireless communication device 900 may include a receiver 910, a communications manager 915, a BLER component 930, a frame component 940, and a transmitter 920, which may be in communication with one another (for example, via one or more buses). In some examples, the wireless communication device 900 is configured to perform operations, including operations of the process 1000 described below with reference to FIG. 10.

In some examples, the wireless communication device 900 can include a chip, system on chip (SOC), chipset, package, or device that includes at least one processor and at least one modem (for example, a 5G modem or other cellular modem). In some examples, the communications manager 915, or its sub-components, may be separate and distinct components. In some examples, at least some components of the communications manager 915 are implemented at least in part as software stored in a memory. For example, portions of one or more of the components of the communications manager 915 can be implemented as non-transitory code executable by the processor to perform the functions or operations of the respective component.

The receiver 910 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PUCCH or a PSCCH) and data channels (for example, a PUSCH or a PSSCH). The other wireless communication devices may include, but are not limited to, a UE 120, described with reference to FIGS. 1, 3, and 5.

The received information may be passed on to other components of the wireless communication device 900. The receiver 910 may be an example of aspects of the receive processor 270 described with reference to FIG. 2. The receiver 910 may include a set of radio frequency (RF) chains that are coupled with or otherwise utilize a set of antennas (for example, the set of antennas may be an example of aspects of the antennas 234 described with reference to FIG. 2).

The transmitter 920 may transmit signals generated by the communications manager 915 or other components of the wireless communication device 900. In some examples, the transmitter 920 may be collocated with the receiver 910 in a transceiver. The transmitter 920 may be an example of aspects of the transmit processor 216 described with reference to FIG. 2. The transmitter 920 may be coupled with or otherwise utilize a set of antennas (for example, the set of antennas may be an example of aspects of the antennas 252), which may be antenna elements shared with the receiver 910. In some examples, the transmitter 920 is configured to transmit control information in a PDCCH or a PSCCH and data in a PDSCH or PSSCH.

The communications manager 915 may be an example of aspects of the controller/processor 275 described with reference to FIG. 2. The communications manager 915 includes the BLER component 930 and the frame component 940. In some examples, working in conjunction with the transmitter 920 the frame component 940 transmits a first group of frames comprising a group of first normal slots and one or more first special slots. Additionally, working in conjunction with one or more of the transmitter 920, the receiver 910, or the frame component 940, the BLER component 930 reconfigures one or more second special slots within a second group of frames scheduled after the first group of frames based on a BLER associated with the number of first normal slots failing to satisfy a BLER condition. Finally, working in conjunction with one or both of the BLER component 930 or the transmitter 920, the frame component 940 transmits the second group of frames based on reconfiguring the one or more second special slots within the second group of frames.

Figure 10:
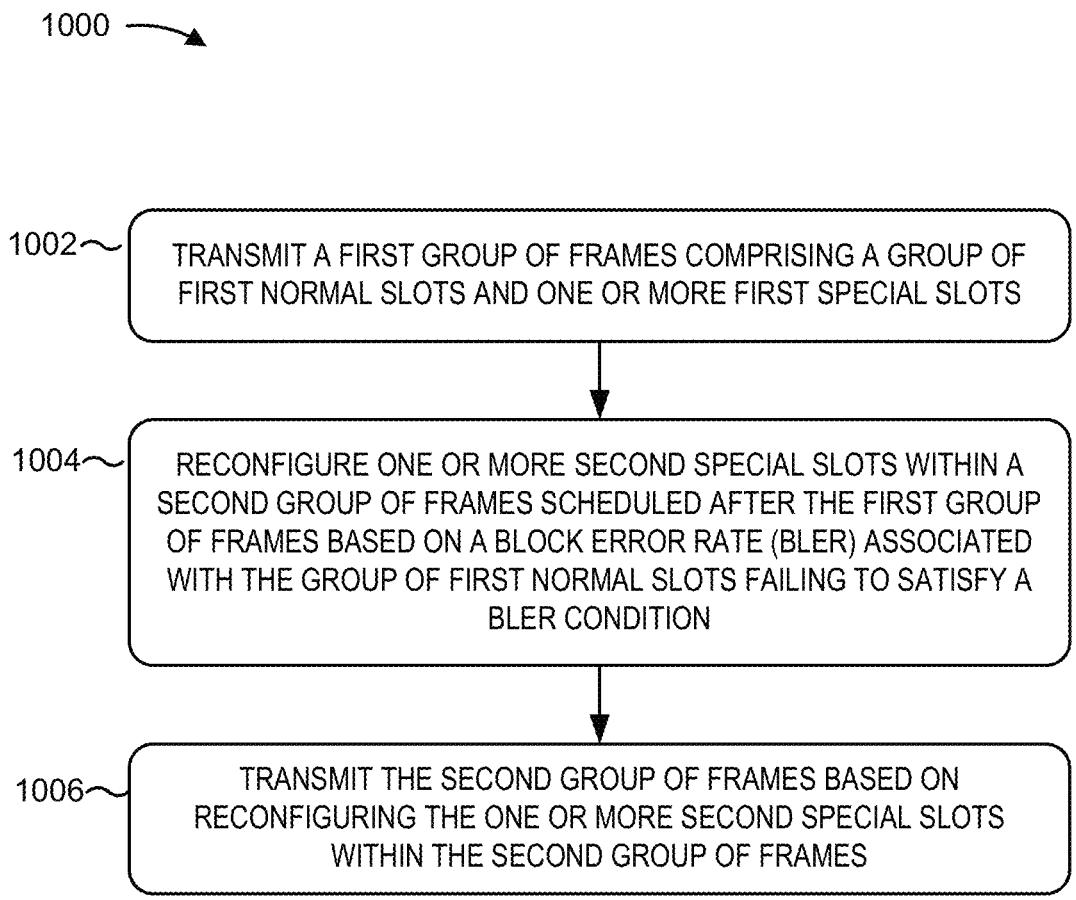
FIG. 10 is a flow diagram illustrating an example of a process performed by a network node, in accordance with some aspects of the present disclosure.

FIG. 10 is a flow diagram illustrating an example of a process 1000 performed by a wireless device, in accordance with some aspects of the present disclosure. The wireless device may be an example of a base station 110 described with reference to FIGS. 1 and 2, a DU 330 described with reference to FIG. 3, a CU 310 described with reference to FIG. 3, or a network node 502 described with reference to FIG. 5. The example process 1000 is an example of reconfiguring special slots. As shown in FIG. 10, the process 1000 begins at block 1002, by transmits a first group of frames comprising a group of first normal slots and one or more first special slots. At block 1004, the process reconfigures one or more second special slots within a second group of frames scheduled after the first group of frames based on a BLER associated with the number of first normal slots failing to satisfy a BLER condition. The second group of frames include a group of second normal slots and the one or more second special slots. At block 1006, the process transmits the second group of frames based on reconfiguring the one or more second special slots within the second group of frames.

Implementation examples are described in the following numbered clauses:

Clause 1. A method for wireless communication by a network node, comprising: transmitting a first group of frames comprising a group of first normal slots and one or more first special slots; reconfiguring one or more second special slots within a second group of frames scheduled after the first group of frames based on a BLER associated with the group of first normal slots failing to satisfy a BLER condition, the second group of frames comprising a plurality of second normal slots and the one or more second special slots; and transmitting the second group of frames based on reconfiguring the one or more second special slots within the second group of frames.

Clause 2. The method of Clause 1, wherein: each of the one or more second special slots is dynamically configured as either an uplink slot or a downlink slot; and a number of symbols in each second special slot of the one or more second special slots is less than or equal to seven.

Clause 3. The method of Clause 1, wherein the one or more second special slots are rate-matched slots.

Clause 4. The method of any one of Clauses 1-3, wherein the BLER fails to satisfy the BLER condition based on the BLER being less than a value associated with a difference between a target BLER and a margin BLER.

Clause 5. The method of Clause 1, wherein the reconfiguration of the one or more second special slots reconfigures the one or more second special slots to use a first link adaptation loop that is different than a second link adaptation loop that the group of first normal slots are configured to use.

Clause 6. The method of any one of Clauses 1-4, wherein reconfiguring the one or more second special slots comprises cancelling respective transmissions scheduled on the one or more second special slots within the second group of frames.

Clause 7. The method of claim 6, further comprising: scheduling transmissions on one or more third special slots and one or more second normal slots within a third group of frames that are scheduled after the second group of frames, the third group of frames comprising a group of second normal slots and the one or more third special slots; and reconfiguring the one or more third special slots based on a BLER associated with the group of second normal slots failing to satisfy the BLER condition.

Clause 8. The method of any one of Clauses 1-4, wherein reconfiguring the one or more second special slots comprises adjusting a respective rank and a respective MCS associated with each second special slot of the one or more second special slots.

Clause 9. A method for wireless communication by a UE, comprising: receiving, from a network node, a first group of frames comprising a group of first normal slots and one or more first special slots; transmitting, to the network node based on a BLER associated with the group of first normal slots failing to satisfy a BLER condition, a message requesting an adjustment to a schedule or an adjustment to a rank and an MCS associated with one or more second special slots within a second group of frames scheduled after the first group of frames, the second group of frames comprising a plurality of second normal slots and the one or more second special slots; and receiving, from the network node, the second group of frames based on transmitting the message.

Clause 10. The method of Clause 9, wherein: teach of the one or more second special slots is dynamically configured as an uplink slot or a downlink slot; and a number of symbols in each special slot is less than or equal to seven.

Clause 11. The method of Clause 9, wherein the one or more second special slots are rate-matched slots.

Clause 12. The method of any one of Clauses 9-11, wherein the BLER fails to satisfy the BLER condition based on the BLER being less than a value associated with a difference between a target BLER and a margin BLER.

Clause 13. The method of any one of Clauses 9-12, wherein: the message requests the adjustment to the schedule associated with the one or more second special slots; and transmissions scheduled on the one or more second special slots are cancelled based on transmitting the message.

Clause 14. The method of Clause 13, further comprising: receiving, from the network node, a third group of frames comprising a second group of normal slots and one or more third special slots, the one or more third special slots being associated with a scheduled transmission; and transmitting, to the network node based on a BLER associated with the plurality of third normal slots failing to satisfy the BLER condition, a message requesting an adjustment to a schedule or an MCS associated with one or more third special slots.

Clause 15. The method of any one of Clauses 9-12, wherein the message requests the adjustment to the rank and the MCS associated with the one or more second special slots.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such.

Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication by a network node, comprising:
   transmitting a first group of frames comprising a plurality of first normal slots and one or more first special slots;
   reconfiguring one or more second special slots within a second group of frames scheduled after the first group of frames based on a block error rate (BLER) associated with the plurality of first normal slots failing to satisfy a BLER condition, the second group of frames comprising a plurality of second normal slots and the one or more second special slots; and
   transmitting the second group of frames based on reconfiguring the one or more second special slots within the second group of frames.

2. The method of claim 1, wherein:
   each of the one or more second special slots is dynamically configured as either an uplink slot or a downlink slot; and
   a number of symbols in each second special slot of the one or more second special slots is less than or equal to seven.

3. The method of claim 1, wherein the one or more second special slots are rate-matched slots.

4. The method of claim 1, wherein the BLER fails to satisfy the BLER condition based on the BLER being less than a value associated with a difference between a target BLER and a margin BLER.

5. The method of claim 1, wherein the reconfiguration of the one or more second special slots reconfigures the one or more second special slots to use a first link adaptation loop that is different than a second link adaptation loop that the plurality of first normal slots are configured to use.

6. The method of claim 1, wherein reconfiguring the one or more second special slots comprises cancelling respective transmissions scheduled on the one or more second special slots within the second group of frames.

7. The method of claim 6, further comprising:
   scheduling transmissions on one or more third special slots and one or more second normal slots within a third group of frames that are scheduled after the second group of frames, the third group of frames comprising a plurality of third normal slots and the one or more third special slots; and
   reconfiguring the one or more third special slots based on a BLER associated with the plurality of second normal slots failing to satisfy the BLER condition.

8. The method of claim 1, wherein reconfiguring the one or more second special slots comprises adjusting a respective rank and a respective modulation and coding scheme (MCS) associated with each second special slot of the one or more second special slots.

9. An apparatus for wireless communications at a network node, comprising:
   a processor; and
   a memory coupled with the processor and storing instructions operable, when executed by the processor, to cause the apparatus to:
      transmit a first group of frames comprising a plurality of first normal slots and one or more first special slots;
      reconfigure one or more second special slots within a second group of frames scheduled after the first group of frames based on a block error rate (BLER) associated with the plurality of first normal slots failing to satisfy a BLER condition, the second group of frames comprising a plurality of second normal slots and the one or more second special slots; and
      transmit the second group of frames based on reconfiguring the one or more second special slots within the second group of frames.

10. The apparatus of claim 9, wherein:
    each of the one or more second special slots is dynamically configured as either an uplink slot or a downlink slot; and
    a number of symbols in each second special slot of the one or more second special slots is less than or equal to seven.

11. The apparatus of claim 9, wherein the one or more second special slots are rate-matched slots.

12. The apparatus of claim 9, wherein the BLER fails to satisfy the BLER condition based on the BLER being less than a value associated with a difference between a target BLER and a margin BLER.

13. The apparatus of claim 9, wherein the reconfiguration of the one or more second special slots reconfigures the one or more second special slots to use a first link adaptation loop that is different than a second link adaptation loop that the plurality of first normal slots are configured to use.

14. The apparatus of claim 9, wherein reconfiguring the one or more second special slots comprises cancelling respective transmissions scheduled on the one or more second special slots within the second group of frames.

15. The apparatus of claim 14, wherein execution of the instructions further cause the apparatus to:
    schedule transmissions on one or more third special slots and one or more second normal slots within a third group of frames that are scheduled after the second group of frames, the third group of frames comprising a plurality of third normal slots and the one or more third special slots; and
    reconfigure the one or more third special slots based on a BLER associated with the plurality of second normal slots failing to satisfy the BLER condition.

16. The apparatus of claim 9, wherein reconfiguring the one or more second special slots comprises adjusting a respective rank and a respective modulation and coding scheme (MCS) associated with each second special slot of the one or more second special slots.

17. A method for wireless communication by a user equipment (UE), comprising:
    receiving, from a network node, a first group of frames comprising a plurality of first normal slots and one or more first special slots;
    transmitting, to the network node based on a block error rate (BLER) associated with the plurality of first normal slots failing to satisfy a BLER condition, a message requesting an adjustment to a schedule or an adjustment to a rank and a modulation and coding scheme (MCS)

associated with one or more second special slots within a second group of frames scheduled after the first group of frames, the second group of frames comprising a plurality of second normal slots and the one or more second special slots; and receiving, from the network node, the second group of frames based on transmitting the message.

18. The method of claim 17, wherein:
each of the one or more second special slots is dynamically configured as an uplink slot or a downlink slot; and
a number of symbols in each special slot is less than or equal to seven.

19. The method of claim 17, wherein the one or more second special slots are rate-matched slots.

20. The method of claim 17, wherein the BLER fails to satisfy the BLER condition based on the BLER being less than a value associated with a difference between a target BLER and a margin BLER.

21. The method of claim 17, wherein:
the message requests the adjustment to the schedule associated with the one or more second special slots; and
transmissions scheduled on the one or more second special slots are cancelled based on transmitting the message.

22. The method of claim 21, further comprising:
receiving, from the network node, a third group of frames comprising a plurality of third normal slots and one or more third special slots, the one or more third special slots being associated with a scheduled transmission; and
transmitting, to the network node based on a BLER associated with the plurality of third normal slots failing to satisfy the BLER condition, a message requesting an adjustment to a schedule or an MCS associated with the one or more third special slots.

23. The method of claim 17, wherein the message requests the adjustment to the rank and the MCS associated with the one or more second special slots.

24. An apparatus for wireless communications at a user equipment (UE), comprising:
a processor; and
a memory coupled with the processor and storing instructions operable, when executed by the processor, to cause the apparatus to:
receive, from a network node, a first group of frames comprising a plurality of first normal slots and one or more first special slots;
transmit, to the network node based on a block error rate (BLER) associated with the plurality of first normal slots failing to satisfy a BLER condition, a message requesting an adjustment to a schedule or an adjustment to a rank and a modulation and coding scheme (MCS) associated with one or more second special slots within a second group of frames scheduled after the first group of frames, the second group of frames comprising a plurality of second normal slots and the one or more second special slots; and
receive, from the network node, the second group of frames based on transmitting the message.

25. The apparatus of claim 24, wherein:
each of the one or more second special slots is dynamically configured as an uplink slot or a downlink slot; and
a number of symbols in each special slot is less than or equal to seven.

26. The apparatus of claim 24, wherein the one or more second special slots are rate-matched slots.

27. The apparatus of claim 24, wherein the BLER fails to satisfy the BLER condition based on the BLER being less than a value associated with a difference between a target BLER and a margin BLER.

28. The apparatus of claim 24, wherein:
the message requests the adjustment to the schedule associated with the one or more second special slots; and
transmissions scheduled on the one or more second special slots are cancelled based on transmitting the message.

29. The apparatus of claim 28, wherein execution of the instructions further cause the apparatus to:
receive, from the network node, a third group of frames comprising a plurality of third normal slots and one or more third special slots, the one or more third special slots being associated with a scheduled transmission; and
transmit, to the network node based on a BLER associated with the plurality of third normal slots failing to satisfy the BLER condition, a message requesting an adjustment to a schedule or an MCS associated with the one or more third special slots.

30. The apparatus of claim 24, wherein the message requests the adjustment to the rank and the MCS associated with the one or more second special slots.

* * * * *